(12) United States Patent
Sato et al.

(10) Patent No.: US 8,835,545 B2
(45) Date of Patent: Sep. 16, 2014

(54) RUBBER COMPOSITION FOR USE IN TIRE TREADS

(75) Inventors: Masaki Sato, Hiratsuka (JP); Takeshi Kiyohara, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 219 days.

(21) Appl. No.: 12/852,185

(22) Filed: Aug. 6, 2010

(65) Prior Publication Data

US 2011/0086943 A1    Apr. 14, 2011

(30) Foreign Application Priority Data

Aug. 10, 2009   (JP) ................................ 2009-185794

(51) Int. Cl.
| | | |
|---|---|---|
| B60C 1/00 | (2006.01) | |
| C08K 3/36 | (2006.01) | |
| C08K 3/04 | (2006.01) | |
| C08L 15/00 | (2006.01) | |
| C08L 9/00 | (2006.01) | |

(52) U.S. Cl.
CPC ......... B60C 1/0016 (2013.04); *C08K 2201/006* (2013.01); *C08K 3/04* (2013.01); C08K 3/36 (2013.01); *C08L 9/00* (2013.01); C08L 15/00 (2013.01); *Y02T 10/862* (2013.01)
USPC ........... 524/493; 524/492; 524/495; 524/496; 524/575

(58) Field of Classification Search
CPC ...... C08K 3/04; C08K 3/36; C08K 2201/006; C08L 9/06; C08L 15/00; B60C 1/0016
USPC ............................ 524/492, 493, 495, 496, 575
See application file for complete search history.

(56) References Cited

U.S. PATENT DOCUMENTS

| | | | | |
|---|---|---|---|---|
| 4,929,679 | A | * | 5/1990 | Akita et al. .................... 525/194 |
| 6,057,397 | A | * | 5/2000 | Takagishi et al. ............. 524/492 |
| 6,252,008 | B1 | * | 6/2001 | Scholl et al. ................ 525/333.5 |
| 6,472,461 | B1 | * | 10/2002 | Nakamura et al. ............ 524/492 |
| 7,122,586 | B2 | * | 10/2006 | Sandstrom et al. ........... 523/344 |
| 2005/0032965 | A1 | * | 2/2005 | Valero ........................... 524/493 |
| 2006/0116465 | A1 | * | 6/2006 | Hiza et al. ..................... 524/493 |
| 2008/0223494 | A1 | * | 9/2008 | Amino et al. ............... 152/209.1 |

FOREIGN PATENT DOCUMENTS

| | | |
|---|---|---|
| FR | 2910459 | 6/2008 |
| JP | 06-065418 | 3/1994 |
| JP | 2005500238 | 1/2005 |
| JP | 2005500420 | 1/2005 |
| JP | 2008056907 | 3/2008 |
| JP | 3488926 | 11/2008 |
| WO | WO9623027 | 8/1996 |

\* cited by examiner

*Primary Examiner* — Vickey Nerangis
(74) *Attorney, Agent, or Firm* — Thorpe North & Western LLP

(57) ABSTRACT

A rubber composition for use in tire treads including 100 parts by mass of a diene rubber and from 70 to 100 parts by mass of silica, wherein the diene rubber includes from 50 to 90 mass % of a terminal-modified styrene-butadiene rubber having a hydroxy group on an end of the molecule, and from 10 to 25 mass % of a butadiene rubber; the silica has a BET specific surface area of from 45 to 550 $m^2/g$, a CTAB specific surface area of from 40 to 525 $m^2/g$, a particle size distribution width $L_d((d_{84}-d_{16})/d_{50})$ of at least 0.91, and wherein $V_{(d5\text{-}d50)}/V_{(5\text{-}d100)}$ is at least 0.66; and a durometer hardness of the rubber composition when measured at 20° C. is from 70 to 80.

12 Claims, 1 Drawing Sheet

| | | | Ex. 1 | Ex. 2 | CE 1 | CE 2 | CE 3 | CE 4 | CE 5 | CE 6 | CE 7 | CE 8 | CE 9 | CE 10 | CE 11 |
|---|---|---|---|---|---|---|---|---|---|---|---|---|---|---|---|
| Composition | Terminal-modified SBR | PBM | 80 | 80 | 80 | 40 | 40 | | | | | | | | |
| | Unmodified SBR | PBM | | | | | | 80 | 100 | 100 | 95 | 70 | 80 | 80 | 80 |
| | Butadiene rubber | PBM | 20 | 20 | | 40 | 40 | 20 | | | 5 | 30 | | 20 | 20 |
| | Natural rubber | PBM | | | 20 | | 20 | | | | | | 20 | | |
| | Silica 1 | PBM | 70 | 80 | | 70 | 70 | 70 | 70 | 70 | 70 | 70 | 70 | 70 | 70 |
| | Silica 2 | PBM | | | 70 | | | | | | | | | | |
| | Carbon black | PBM | 20 | 10 | 20 | 20 | 20 | 20 | 20 | 20 | 20 | 20 | 20 | 20 | 20 |
| | Zinc oxide | PBM | 3 | 3 | 3 | 3 | 3 | 3 | 3 | 3 | 3 | 3 | 3 | 3 | 3 |
| | Stearic acid | PBM | 2 | 2 | 2 | 2 | 2 | 2 | 2 | 2 | 2 | 2 | 2 | 2 | 2 |
| | Antiaging agent | PBM | 2 | 2 | 2 | 2 | 2 | 2 | 2 | 2 | 2 | 2 | 2 | 2 | 2 |
| | Wax | PBM | 2 | 2 | 2 | 2 | 2 | 2 | 2 | 2 | 2 | 2 | 2 | 2 | 2 |
| | Processing aid | PBM | 3 | 3 | 3 | 3 | 3 | 3 | 3 | 3 | 3 | 3 | 3 | 3 | 3 |
| | Silane coupling agent | PBM | 5.6 | 6.4 | 5.6 | 5.6 | 5.6 | 5.6 | 5.6 | 5.6 | 5.6 | 5.6 | 5.6 | 5.6 | 5.6 |
| | Sulfur | PBM | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator CBS | PBM | 2.0 | 2.0 | 2.0 | 2.0 | 2.0 | 2.0 | 2.0 | 2.0 | 2.0 | 2.0 | 2.0 | 2.0 | 2.0 |
| | Vulcanization accelerator DPG | PBM | 0.5 | 0.5 | 0.5 | 0.5 | 0.5 | 0.5 | 0.5 | 0.5 | 0.5 | 0.5 | 0.5 | 0.5 | 0.5 |
| | Amount of oil in rubber composition | PBM | 25 | 25 | 25 | 25 | 25 | 25 | 25 | 25 | 25 | 25 | 25 | 45 | 4 |
| Rubber physical properties | Durometer hardness (20°C) | | 74 | 73 | 74 | 74 | 74 | 75 | 75 | 74 | 75 | 72 | 74 | 67 | 82 |
| | tan δ (60°C) | | 106 | 110 | 100 | 98 | 100 | 97 | 94 | 102 | 102 | 106 | 103 | 104 | 102 |
| | 300% modulus | | 103 | 102 | 100 | 98 | 99 | 96 | 100 | 105 | 104 | 96 | 98 | 96 | 105 |
| | Lambourn abrasion resistance | | 106 | 104 | 100 | 98 | 101 | 98 | 90 | 95 | 97 | 108 | 95 | 105 | 103 |
| | Mooney viscosity | | 98 | 98 | 100 | 103 | 101 | 104 | 99 | 92 | 94 | 102 | 93 | 110 | 85 |
| Tire properties | Steering stability | | 102 | 100 | 100 | 97 | 99 | 96 | 100 | 105 | 104 | 97 | 98 | 90 | 92 |
| | Wet grip performance | | 107 | 110 | 100 | 97 | 100 | 94 | 97 | 112 | 109 | 100 | 108 | 103 | 96 |

RUBBER COMPOSITION FOR USE IN TIRE TREADS

PRIORITY CLAIM

This application is based upon and claims the benefit of priority from Japanese Patent Application No. 2009-185794, filed Aug. 10, 2009, the entire contents of which is incorporated herein by reference.

BACKGROUND

1. Technical Field

The present invention is related to a rubber composition for use in tire treads.

2. Related Art

Rubber compositions for use in tire treads including a terminal-modified vinyl aromatic-diene copolymer and an emulsion polymerized styrene-butadiene copolymer rubber and/or a solution polymerized styrene-butadiene copolymer rubber are known as rubber compositions for use in treads of tires for use in high-speed running (Japanese Unexamined Patent Application No. H06-65418).

Additionally, compounding a diene rubber with silica and using a modified diene rubber in which a substituent having affinity with silica has been introduced as the diene rubber is also known. For example, a rubber composition is described in Japanese Patent No. 3488926 that includes a hydroxy group-containing diene rubber and silica. A rubber composition highly compounded with silica including a terminal hydroxy-modified solution polymerized styrene-butadiene copolymer is described in Japanese Unexamined Patent Application Publication No. 2008-056907.

Additionally, silica is being developed in a variety of ways for use as a filler in polymer compositions. A silica having a particular CTAB (cetyltrimethyl ammonium bromide) specific surface area, a particular BET (Brunauer, Emmett and Teller) specific surface area, a particular physical dimension distribution width, and a particular pore volume distribution is described in Japanese Unexamined Patent Application Publication (translation of PCT application) No. 2005-500238. Using a diene rubber composition including a silica having a particular BET specific surface area, a particular CTAB specific surface area, a particular average particle size, and a particular particle size distribution, porosity, or amount of silanol in the manufacturing of treads for tires for the purposes of reducing rolling resistance and improving abrasion resistance of tires is described in Japanese Unexamined Patent Application Publication (translation of PCT application) No. 2005-500420.

In the development of summer tires for use in Europe, stability when changing lanes during extremely high-speed running such as on the Autobahn is an important factor. Therefore, the development of a tire with superior steering stability during high-speed running is of importance. Additionally, demand for environmental friendly tires that are fuel efficient has increased year by year.

Generally, in order to improve steering stability it has been necessary to provide tires with a high degree of hardness, but compounding large amounts of a filler in order to achieve such high degree of hardness leads to a sacrifice in fuel consumption performance. On the other hand, when an amount of a softener is reduced to ensure a high degree of hardness while a compounded amount of the filler is reduced to ensure fuel consumption performance, it becomes difficult to achieve both fuel consumption performance and mixing processability.

SUMMARY

The present invention is a rubber composition for use in tire treads including 100 parts by mass of a diene rubber and from 70 to 100 parts by mass of silica, wherein the diene rubber includes from 50 to 90 mass % of a terminal-modified styrene-butadiene rubber having a hydroxy group on an end of the molecule, and from 10 to 25 mass % of a butadiene rubber; the silica has a BET specific surface area of from 45 to 550 $m^2/g$, a CTAB specific surface area of from 40 to 525 $m^2/g$, a particle size distribution width $L_d((d_{84}-d_{16})/d_{50})$ of at least 0.91, wherein $V_{(d5-d50)}/V_{(d5-d100)}$ is at least 0.66; and a durometer hardness of the rubber composition when measured at 20° C. is from 70 to 80.

The rubber composition of the present invention preferably further includes a carbon black having a nitrogen specific surface area ($N_2SA$) of from 70 to 100 $m^2/g$, a total amount of the carbon black and the silica being from 75 to 120 parts by mass per 100 parts by mass of the diene rubber. The rubber composition of the present invention preferably further includes a softener, an amount of the softener being from 5 to 40 parts by mass per 100 parts by mass of the diene rubber.

Additionally, the present invention is a pneumatic tire having a tread manufactured from the rubber composition.

With the present invention, by combining a terminal-modified styrene-butadiene rubber having a hydroxy group on an end of the molecule, a butadiene rubber, and a silica having a particular pore distribution and particle size distribution, making a compound having a high degree of hardness, low heat generation, and excellent mixing processability is possible; and a cap tread with highly balanced high-speed steering stability and fuel efficiency, and furthermore, wet grip performance and abrasion resistance can be produced.

BRIEF DESCRIPTION OF THE DRAWINGS

FIG. 1 is a table of evaluation results for a rubber composition according to an embodiment of the present invention.

DETAILED DESCRIPTION

A rubber composition for use in tire treads of the present invention includes a diene rubber and silica.

The diene rubber for use in the present invention includes a terminal-modified styrene-butadiene rubber having a hydroxy group on an end of the molecule and a butadiene rubber.

The terminal-modified styrene-butadiene rubber having a hydroxy group on an end of the molecule for use in the present invention (hereinafter, the "terminal-modified styrene-butadiene rubber") can be produced, for example, by copolymerizng styrene and butadiene using an anionic polymerizing catalyst, reacting the obtained copolymer having an active end with a modifier, and introducing a hydroxy group on an end of the copolymer. More specifically, the terminal-modified styrene-butadiene rubber can be produced according to the methods described in Japanese Unexamined Patent Application No. H06-65418 and Japanese Patent No. 3488926. Additionally, commercially available products such as, for example, NS616 (manufactured by Zeon Corporation) can be used.

An amount of the styrene included in the terminal-modified styrene-butadiene rubber is preferably from 20 to 45 mass % and more preferably from 20 to 40 mass %. It is preferable that the amount of the styrene be within this range because when it is both abrasion resistance and grip performance will be realized.

A vinyl bond content in a butadiene moiety of the terminal-modified styrene-butadiene rubber is preferably from 30 to 80 mass % and more preferably from 35 to 75 mass %. It is preferable that the vinyl bond content be within this range because when it is both abrasion resistance and grip performance will be realized.

The terminal-modified styrene-butadiene rubber may also include an isoprene unit. It is preferable that an isoprene unit be included because when it is heat generation can be lowered and abrasion resistance can be improved. When including the isoprene unit, an amount of the isoprene unit to be included in the terminal-modified styrene-butadiene rubber is preferably from 0.1 to 10.0 mass % and more preferably from 0.2 to 5.0 mass %.

Butadiene rubbers that are commonly used for tires can be used as the butadiene rubber for use in the present invention. Butadiene rubber is commercially available from many manufacturers and these commercially available products can be used in the present invention. There are high-cis butadiene rubbers and low-cis butadiene rubbers and either can be used in the present invention, but the butadiene rubber is preferably a high-cis butadiene rubber, and is more preferably a high-cis butadiene rubber having 90% or more cis-1,4 bonds. By using the high-cis butadiene rubber, abrasion resistance of the tire and mixing processability can be ensured.

A mass-average molecular weight of the butadiene rubber for use in the present invention is preferably from $5.0 \times 10^5$ to $1.0 \times 10^6$ and more preferably from $5.5 \times 10^5$ to $9.0 \times 10^5$. It is preferable that the mass-average molecular weight be within this range because when it is both abrasion resistance and mixing processability will be realized. Additionally, a combination of high molecular weight butadiene rubber and low molecular weight butadiene rubber can be used. It is preferable that a combination of a high molecular weight butadiene rubber with a mass-average molecular weight of from 500,000 to 1,000,000 and a low molecular weight butadiene rubber with a mass-average molecular weight of from 6,000 to 60,000 be used because when they are, in addition to abrasion resistance and mixing processability, grip performance can be improved.

Based on a total mass of the diene rubber, a proportion of the terminal-modified styrene-butadiene rubber included in the diene rubber is from 50 to 90 mass %, but is preferably from 60 to 90 mass %, and more preferably from 70 to 90 mass %. If the proportion of the terminal-modified styrene-butadiene rubber is too low, the improvement effects of wet grip performance and lowering heat generation will be insufficient.

Based on the total mass of the diene rubber, a proportion of the butadiene rubber included in the diene rubber is from 10 to 25 mass %, but is preferably from 10 to 20 mass %. If the proportion of the butadiene rubber is too low, abrasion resistance will be insufficient, but it the proportion is too high, wet grip performance will be insufficient.

The diene rubber for use in the present invention may include rubbers other than the terminal-modified styrene-butadiene rubber having a hydroxy group on an end of the molecule and the butadiene rubber (hereinafter, the "other rubbers"). Examples of the other rubbers include natural rubber, styrene-butadiene rubber that is not terminal-modified, isoprene rubber, acrylonitrile-butadiene rubber, hydrogenated nitrile rubber, butyl rubber, halogenated butyl rubber, and chloroprene rubber.

Based on the total mass of the diene rubber, a proportion of the other rubbers included in the diene rubber is from 0 to 40 mass %.

A silica for use in the present invention has a BET specific surface area of from 45 to 550 $m^2/g$, preferably from 194 to 225 $m^2/g$, a CTAB specific surface area of from 40 to 525 $m^2/g$, preferably from 170 to 210 $m^2/g$, a particle size distribution width $L_d((d_{84}-d_{16})/d_{50})$ of at least 0.91, and wherein $V_{(d5-d50)}/V_{(d5-d100)}$ is at least 0.66.

Here, the BET specific surface area is measured using the Brenauer-Emmett-Taylor method described in US scientific journal, "The Journal of the American Chemical Society," Vol. 60, p. 309, February 1938, and corresponding to Table D of ISO 5794/1.

The CTAB specific surface area is an external surface area measured in accordance with standard NF T 45007 (November 1987) (5.12).

The particle size distribution width $L_d$ corresponds to a ratio of $(d_{84}-d_{16})/d_{50}$. However, $d_n$ is a particle size that has n % (mass %) of particles that are smaller than that particle size.

$d_n$ is measured by a XDC particle size analysis method using centrifugal sedimentation. Specifically, $d_n$ is measured as follows:

Necessary Equipment:
  BI-XDC (Brookhaven Instruments X-Ray Disc Centrifuge) centrifugal sedimentation particle size analyzer (commercially available from Brookhaven Instruments Limited)
  50 mL tall beaker
  50 mL graduated cylinder
  1500 watt, 13 mm diameter Branson ultrasonic probe with no endpiece
  Deionized water
  Ice-packing crystallizer
  Magnetic mixer Measurement Conditions:
  DOS v1.35 software (provided by a manufacturer of particle size analyzers)
  Fixed mode
  Rotation speed
  Analysis time: 120 min.
  Density (silica): 2.1
  Volume of suspension for sampling: 15 mL Preparation of Analyte
  3.2 g of silica and 40 mL of deionized water are added to a tall beaker.
  The beaker containing the suspension is placed in the ice-packing crystallizer.
  An ultrasonic probe is placed in the beaker.
  Using a 1500 watt Branson probe (used at 60% of a maximum output) the suspension is disintegrated over the course of 20 minutes.
  After disintegration, the beaker is placed on a magnetic mixer.

Preparation of the Particle Size Analyzer:
  The device is turned on and left warm for 30 minutes.
  The disc is rinsed twice using deionized water.
  15 mL of the analyte to be analyzed is introduced onto the disc and agitation is begun.
  The aforementioned measurement conditions are input into the software.
  Particle size is measured.
  When measurement values are obtained:
  The rotation of the disc is stopped.
  The disc is rinsed multiple times using deionized water.
  The device is turned off.

Results

Values of diameters passing through at 16 mass %, 50 mass % (mean value), and 84 mass % are recorded in the recording unit of the device.

$V_{(d5-d50)}/V_{(d5-d100)}$ is an indicator of pore volume distribution. $V_{(d5-d50)}$ represents a pore volume formed by pores with diameters of from d5 to d50. $V_{(d5-d100)}$ represents a pore volume formed by pores with diameters from d5 to d100. However, dn is a pore diameter, and n % of a total surface area of all of the pores is formed by pores that have diameters larger than the diameter of dn (a total surface area of the pores ($S_0$) can be determined from a mercury penetration curve).

The pore volume is measured by mercury porosimetry. Each analyte is prepared in the following manner. Specifically, each analyte is pre-dried in an oven at 200° C. for two hours. Then, within five minutes of being removed from the oven, the analyte is placed in a test container. Next, gas is purged to create a vacuum environment using, for example, a rotary blade type pump. The pore diameters (AUTOPORE III 9420 micromeritics porosimeter) are calculated using the Washburn method at a contact angle of 140° and a surface tension γ of 484 dynes/cmDn can be calculated from a pore size distribution curve (a diagram showing pore volume as a function of pore diameter) measured by mercury porosimetry.

The silica having the particular BET specific surface area, CTAB specific surface area, particle size distribution width, $L_d$, and $V_{(d5-d50)}/V_{(d5-d100)}$ (also referred to hereinafter as the "particular silica") can be produced according to the methods described in Japanese Unexamined Patent Application Publication (translation of PCT application) No. 2005-500238. Additionally, a commercially available product such as Zeosil Premium 200MP (manufactured by Rhodia) can be obtained.

A compounded amount of the silica in the rubber composition is from 70 to 100 parts by mass, preferably 75 to 100 parts by mass, and more preferably from 75 to 95 parts by mass per 100 parts by mass of the diene rubber. If the compounded amount of the silica is too small, wet grip performance will be insufficient. On the other hand, if the compounded amount of the silica is too great, fuel consumption performance will be negatively affected.

A durometer hardness of the rubber composition of the present invention measured at 20° C. is from 70 to 80, preferably from 70 to 77, and more preferably from 70 to 75. If the durometer hardness measured at 20° C. is less than 70, block rigidity of the tread will be too low and sufficient steering stability will be unobtainable. On the other hand, if the durometer hardness measured at 20° C. exceeds 80, the rubber will be too hard, sufficient ground contact with respect to fine asperities of a road surface will be unobtainable, and wet grip performance will be negatively affected. Methods for obtaining a rubber composition having a durometer hardness within the numerical range described above are not particularly limited and a rubber composition having a desired durometer hardness can be obtained by appropriately selecting vulcanizing agents, vulcanizing conditions, softeners, oils, and the like. The durometer hardness of the rubber composition measured at 20° C. is measured in accordance with JIS K6253.

The rubber composition of the present invention preferably includes a carbon black having a nitrogen specific surface area ($N_2SA$) of from 70 to 100 m²/g. Mixing processability is improved by including the carbon black. The nitrogen specific surface area $N_2SA$ of the carbon black for use in the present invention is from 70 to 100 m²/g, preferably from 70 to 95 m²/g, and more preferably from 70 to 90 m²/g. It is preferable that the nitrogen specific surface area $N_2SA$ of the carbon black be within this range because when it is processability can be improved without negatively affecting fuel consumption performance. Here, the nitrogen specific surface area $N_2SA$ refers to a specific surface area as measured in accordance with ASTM D3037.

When the rubber composition of the present invention includes the carbon black, a total amount of the carbon black and the silica is from 75 to 120 parts by mass, preferably from 75 to 110 parts by mass, and more preferably from 75 to 105 parts by mass per 100 parts by mass of the diene rubber. If the total amount of the carbon black and the silica is too small, grip performance will be insufficient. On the other hand, if the total amount is too great, mixing processability will be negatively affected.

The rubber composition of the present invention preferably further includes a softener. By including the softener, durometer hardness of the rubber composition measured at 20° C. can be easily adjusted so as to be within a desired range. Examples of softeners that can be used include any of mineral oil-based softeners, vegetable oil-based softeners, and synthetic softeners. For the mineral oil-based softeners, there are petroleum-based softeners and coal tar-based softeners. Examples of the petroleum-based softeners include processing oils, extender oils, asphalt softeners, paraffins, adepsine oil, petrolatum, and petroleum resins. Examples of the coal tar-based softeners include coal tar and coumarone-indene resin. Examples of the vegetable oil-based softeners include fatty acids, fatty acid salts, fatty oils, waxes, pine oil, dipentene, pine tar, rosin, tall oil, and factice. Examples of the synthetic softeners include synthetic resin softeners such as phenol-aldehyde resins, styrene resins, and atactic polypropylene; liquid rubbers or oligomers such as polybutene, liquid butadiene rubber, liquid isoprene rubber, and liquid acrylonitrile-butadiene rubber; monomeric plasticizers such as dibutyl phthalate, dioctylphthalate, and tricresyl phosphate; polymeric plasticizers; and reactive plasticizers.

An amount of the softener is preferably from 5 to 40 parts by mass, more preferably from 5 to 35 parts by mass, and even more preferably from 10 to 30 parts by mass per 100 parts by mass of the diene rubber. It is preferable that the amount of the softener be within this range because when it is mixing processability can be improved without sacrificing physical properties.

In addition to the aforementioned components, the rubber composition of the present invention can also contain various types of additives that are commonly added to rubber compositions, such as vulcanizing and cross-linking agents, vulcanizing and cross-linking accelerators, antiaging agents, processing aids, silane coupling agents, and the like. Compounded amounts of these additives may be any conventional standard amount, so long as the objects of the present invention are not hindered.

Conventional methods can be used as manufacturing methods for tire treads and pneumatic tires using the rubber composition of the present invention. For example, necessary additives such as vulcanizers and the like are compounded with the rubber composition of the present invention to form a member for use as a tire tread. When using the member to manufacture a pneumatic tire, members normally used in tire manufacturing such as inner liner layers, carcass layers, and belt layers formed from unvulcanized rubber are layered sequentially on a drum for tire molding. Lastly, the member for use as a tire tread is layered and the drum is removed to form a green tire. Next, a desired pneumatic tire can be manufactured by heating and vulcanizing the green tire according to a conventional method.

EXAMPLES

(1) Raw Materials

The following were used as the diene rubber component.

Terminal-modified SBR (Styrene-butadiene rubber): Styrene-butadiene rubber Nipol NS616, manufactured by Zeon Corporation (terminal-modified styrene-butadiene rubber having a hydroxy group on an end of the molecule, no oil extension, styrene content: 23 mass %, vinyl content of butadiene units: 70 mol %)

Unmodified SBR: Styrene-butadiene rubber Nipol NS460, manufactured by Zeon Corporation (37.5 phr oil extension)

Butadiene rubber: Nipol BR1220, manufactured by Zeon Corporation (non-oil extended)

Natural rubber: RSS#3 (non-oil extended)

The following were used as the silica.

Silica 1: Silica Zeosil Premium 200MP, manufactured by Rhodia (BET specific surface area: 222 $m^2/g$, CTAB specific surface area: 200 $m^2/g$, Particle size distribution width $L_d$: 1.00, $V_{(d5-d50)}/V_{(d5-d100)}$: 0.71)

Silica 2: Silica Zeosil165MP, manufactured by Rhodia (BET specific surface area: 163 $m^2/g$, CTAB specific surface area: 159 $m^2/g$, Particle size distribution width: $L_d$: 0.56)

The following were used as the carbon black.

Carbon black: Carbon black N339, manufactured by Thai Carbon Black PCL (Nitrogen specific surface area: 88 $m^2/g$)

The following were used as the other compounded agents.

Zinc oxide: Zinc Oxide #3, manufactured by Seido Chemical Industry Co., Ltd.

Stearic acid: Beads Stearic Acid, manufactured by NOF Corporation Antiaging agent: Santoflex 6PPD, manufactured by Flexsys Wax: SUNNOC, manufactured by Ouchi Shinko Chemical Industrial Co., Ltd.

Processing aid: Aktiplast® PP, manufactured by Rhein Chemie Rheinau GmbH

Silane coupling agent: Si69, manufactured by Evonik Degussa Japan Co., Ltd.

Sulfur: Oil Treated Sulfur, manufactured by Hosoi Chemical Industry Co., Ltd.

Vulcanization accelerator CBS (cyclohexyl benzothiazole sulfonamide): NOCCELER CZ-G, manufactured by Ouchi Shinko Chemical Industrial Co., Ltd. (N-cyclohexyl-2-benzothiazolesulfenamide)

Vulcanization accelerator DPG (diphenylguanidine): Soxinol DPG, manufactured by Sumitomo Chemical Co., Ltd. (1,3-diphenylguanidine)

(2) Preparation of Rubber Composition

According to the compounding ratio in FIG. 1, raw materials other than sulfur and the vulcanization accelerators were mixed for 6 minutes using a 1.7 liter sealed Banbury mixer, discharged from the mixer at 150° C., and then cooled to room temperature. Next, the mixture was mixed for 3 minutes using the 1.7 liter sealed Banbury mixer again and discharged at 140° C. Then, the sulfur and the vulcanization accelerators were mixed in using an open roll to obtain an unvulcanized rubber composition. The unvulcanized rubber composition was vulcanized for 30 minutes at 150° C. in a predetermined mold to form a vulcanized rubber composition.

(3) Evaluation Method for the Rubber Composition

The obtained vulcanized rubber composition was evaluated according to the following methods for the physical properties of durometer hardness measured at 20° C., tan δ (60° C.), 300% modulus, Lambourn abrasion resistance, and Mooney viscosity; and the tire performance criteria of steering stability and wet grip performance.

Durometer Hardness Measured at 20° C.

Type-A durometer hardness at a temperature of 20° C. was measured in accordance with Japanese Industry Standard (JIS) K6253.

Tan δ (60° C.)

In accordance with Japanese Industrial Standard (JIS) K6301, a viscoelastic spectrometer (manufactured by Toyo Seiki Seisakusho, Co., Ltd.), was used to calculate a loss tangent (tan δ (60° C.)) under the following conditions at a temperature of 60° C.: initial distortion=10%; amplitude=±2%, frequency=20 Hz. Tan δ (60° C.) is commonly known as an indicator of rolling resistance. A larger index value indicates less rolling resistance, or, in other words, superior fuel efficiency.

300% Modulus

A JIS #3 dumbbell specimen was made and tensile stress at 300% elongation at room temperature (20° C.) was calculated according to Japanese Industry Standard (JIS) K6251. Index values were recorded with Comparative Example 1 being 100. A larger index value indicates higher hardness.

Lambourn Abrasion Resistance

In accordance with Japanese Industry Standard (JIS) K6264, a Lambourn abrasion resistance test machine (manufactured by Iwamoto Quartz GlassLab Co., Ltd.) was used to measure an amount of abrasion under the following conditions: load=15.0 kg (147.1 newtons) and slip ratio=25%. Index values were recorded with an amount of abrasion of Comparative Example 1 being 100. A larger index value indicates superior abrasion resistance.

Mooney Viscosity

In accordance with Japanese Industry Standard (JIS) K6300, Mooney viscosity (ML1+4/100° C.) was measured at 100° C., and the inverse of that measurement was calculated. Index values were recorded with Comparative Example 1 being 100. Larger index values indicate lower unvulcanized viscosity and excellent processability.

Steering Stability

Tires manufactured using the rubber compositions in their tread portions and having a common tire size of 235/55 R17 were mounted on a vehicle quipped with an Anti-lock Brake System (ABS) and having an engine displacement of 2300 cc. Both front tires and rear tires were inflated to an air pressure of 220 kPa and evaluation of an actual vehicle on a test course was performed. Drivers scored the performance and index values were recorded with Comparative Example 1 being scored as 100. A larger index value indicates superior steering stability.

Wet Grip Performance

Tires manufactured using the rubber compositions in their tread portions and having a common tire size of 235/55 R17 were mounted on an ABS-equipped vehicle having an engine displacement of 2300 cc. Both front tires and rear tires were inflated to an air pressure of 220 kPa. Braking/stopping distance was measured on a wet asphalt road surface having a water depth of from 2 to 3 mm at a speed of 100 km/hr. Braking/stopping distance index values were recorded with Comparative Example 1 being 100. A larger index value indicates shorter braking/stopping distance and superior wet grip performance.

(4) Evaluation Results for the Rubber Composition

Evaluation results are shown in FIG. 1.

The abbreviations used in the column headings in FIG. 1 are as follows: "Ex." is an abbreviation of "Example"; "CE" is an abbreviation of "Comparative Example"; and "PBM" is an abbreviation of "Parts by mass".

The rubber composition of the present invention (Examples 1 and 2) achieves highly balanced steering stability, wet performance, fuel efficiency, and abrasion resistance.

In Comparative example 1, the silica 1 (the particular silica) used in Example 1 was replaced with the silica 2 (a conventional silica other than the particular silica). In comparing Examples 1 and 2 with Comparative example 1, when the durometer hardness (20° C.) is set to the same level, it is clear that the rubber composition of the present invention has greatly reduced heat generation compared to a conventional silica and excellent abrasion resistance and wet grip performance.

In Comparative example 2, the particular silica used in Example 1 was replaced with a conventional silica and the compounded amount of the terminal-modified SBR was reduced from 80 parts by mass to 40 parts by mass. Compared to Comparative example 1, it is clear that rolling resistance, wet grip performance, and the like are negatively affected when the amount of the terminal-modified SBR is reduced, even when using the conventional silica.

In Comparative example 3, the compounded amount of the terminal-modified SBR was reduced from 80 parts by mass, as used in Example 1, to 40 parts by mass. When compared to Comparative example 2, which uses the same compounded amount of the terminal-modified SBR, a tendency towards low rolling resistance and high wet grip performance can be seen, but when the compounded amount of the terminal-modified SBR is large, as in Example 1, a great synergetic effect was observed.

In Comparative example 4, the terminal-modified SBR used in Example 1 was replaced with the unmodified SBR. It is clear that low rolling resistance, abrasion resistance, and wet grip performance were negatively affected by replacing the terminal-modified SBR with the unmodified SBR.

In Comparative example 5, only the unmodified SBR was used as the diene rubber of Example 1. In other words, the butadiene rubber was not compounded. This caused the abrasion resistance to be greatly negatively affected.

In Comparative example 6, only the terminal-modified SBR was used as the diene rubber of Example 1. In other words, the butadiene rubber was not compounded. Just as in Comparative example 5, the abrasion resistance was greatly negatively affected. Moreover, it is clear that viscosity rose greatly, and that mixing processability was greatly negatively affected.

In Comparative example 7, the compounded amount of the butadiene rubber was reduced from 20 parts by mass, as used in Example 1, to 5 parts by mass and the compounded amount of the terminal-modified SBR was increased from 80 parts by mass, as used in Example 1, to 95 parts by mass. The butadiene rubber was compounded, but it is clear that at this amount abrasion resistance is not yet sufficient.

In Comparative example 8, the compounded amount of the butadiene rubber was increased from 20 parts by mass, as used in Example 1, to 30 parts by mass and the compounded amount of the terminal-modified SBR was reduced from 80 parts by mass, as used in Example 1, to 70 parts by mass. It is clear that when the compounded amount of the butadiene rubber was great, wet grip performance could not be expressed.

In Comparative example 9, the butadiene rubber used in Example 1 was replaced with the natural rubber. It is clear that when the natural rubber was used, compared to when the butadiene rubber was used, abrasion resistance was greatly inferior, and viscosity rose greatly which led to insufficient mixing processability.

In Comparative example 10, the durometer hardness measured at 20° C. was less than 70. It is clear that when the hardness was less than 70 that sufficient steering stability could not be ensured.

In Comparative example 11, the durometer hardness measured at 20° C. was greater than 80. It is clear that when the hardness was too high that sufficient ground contact with respect to fine asperities of a road surface was unobtainable and wet grip performance was negatively affected.

The rubber composition of the present invention is to be used in tire treads. It can particularly be used favorably in the manufacture of treads of tires for high-speed running.

What is claimed is:

1. A rubber composition for use in tire treads comprising:
100 parts by mass of a diene rubber and
from 75 to 95 parts by mass of a silica,
wherein the diene rubber comprises from 70 to 90 mass % of a terminal-modified styrene-butadiene rubber having a hydroxy group on an end of the molecule and wherein the terminal-modified styrene-butadiene rubber comprises 20 mass % to 40 mass % styrene, and from 10 to 25 mass % of a butadiene rubber wherein the vinyl bond content in a butadiene moiety of the terminal-modified styrene-butadiene rubber is from 35 to 75 mass %;
the silica has a BET specific surface area of from 194 to 225 m$^2$/g, a CTAB specific surface area of from 180 to 210 m$^2$/g, a particle size distribution width $L_d((d_{84}-d_{16})/d_{50})$ of at least 0.91, wherein $V_{(d5\text{-}d50)}/V_{(d5\text{-}d100)}$ is at least 0.66; and a durometer hardness of the rubber composition when measured at 20° C. is from 70 to 75;
the rubber composition further comprises a carbon black having a nitrogen specific surface area (N$_2$SA) of from 70 to 100 m$^2$/g, the total amount of the carbon black and the silica being from 75 to 120 parts by mass per 100 parts by mass of the diene rubber; and
the rubber composition further comprises a softener, the amount of the softener being from 25 to 40 parts by mass per 100 parts by mass of the diene rubber.

2. The rubber composition according to claim 1, wherein the terminal-modified styrene-butadiene rubber comprises 0.1 to 10.0 mass % of isoprene units.

3. The rubber composition according to claim 2, wherein the terminal-modified styrene-butadiene rubber comprises 0.2 to 5.0 mass % of isoprene units.

4. The rubber composition according to claim 1, wherein the butadiene rubber comprises a high-cis butadiene rubber.

5. The rubber composition according to claim 4, wherein the high-cis butadiene rubber comprises a high-cis butadiene rubber having 90% or more cis-1,4 bonds.

6. The rubber composition according to claim 1, wherein a mass-average molecular weight of the butadiene rubber is from $5.0 \times 10^5$ to $1.0 \times 10^6$.

7. The rubber composition according to claim 6, wherein the mass-average molecular weight of the butadiene rubber is from $5.5 \times 10^5$ to $9.0 \times 10^5$.

8. The rubber composition according to claim 1, wherein the butadiene rubber comprises a combination of high molecular weight butadiene rubber and low molecular weight butadiene rubber.

9. The rubber composition according to claim 8, wherein the combination of high molecular weight butadiene rubber and low molecular weight butadiene rubber comprises a high molecular weight butadiene rubber with a mass-average molecular weight of from 500,000 to 1,000,000 and a low molecular weight butadiene rubber with a mass-average molecular weight of from 6,000 to 60,000.

10. The rubber composition according to claim 1, wherein the diene rubber comprises from 10 to 20 mass % of the butadiene rubber.

11. The rubber composition according to claim 1, wherein:
the terminal-modified styrene-butadiene rubber has a styrene content of 23 mass % and the vinyl bond content of the butadiene moiety of the terminal modified styrene-butadiene rubber is 70 mol %;
the silica has a BET specific surface area of 222 $m^2$/g and a CTAB specific surface of 200 $m^2$/g; and
the softener comprises 25 parts by mass of the composition.

12. A pneumatic tire comprising a tread manufactured from the rubber composition according to claim 1.

* * * * *